US012746420B2

(12) United States Patent
Yu et al.

(10) Patent No.: US 12,746,420 B2
(45) Date of Patent: Sep. 29, 2026

(54) FLAME ARRESTER HAVING DEFORMATION UNIT ASSEMBLY

(71) Applicants: CHINA PETROLEUM & CHEMICAL CORPORATION, Beijing (CN); SINOPEC RESEARCH INSTITUTE OF SAFETY ENGINEERING CO., LTD., Qingdao (CN)

(72) Inventors: Anfeng Yu, Qingdao (CN); Yongzhong Bai, Qingdao (CN); Peng Wang, Qingdao (CN); Lei Bao, Qingdao (CN); Chuntao Ge, Qingdao (CN); Yujie Lin, Qingdao (CN); Jiao Zhou, Qingdao (CN); Di Liu, Qingdao (CN)

(73) Assignees: CHINA PETROLEUM & CHEMICAL CORPORATION, Beijing (CN); SINOPEC RESEARCH INSTITUTE OF SAFETY ENGINEERING CO., LTD., Qingdao (CN)

( * ) Notice: Subject to any disclaimer, the term of this patent is extended or adjusted under 35 U.S.C. 154(b) by 383 days.

(21) Appl. No.: 18/551,897

(22) PCT Filed: Mar. 28, 2022

(86) PCT No.: PCT/CN2022/083293

§ 371 (c)(1),
(2) Date: Sep. 22, 2023

(87) PCT Pub. No.: WO2022/206658

PCT Pub. Date: Oct. 6, 2022

(65) Prior Publication Data

US 2024/0165442 A1 May 23, 2024

(30) Foreign Application Priority Data

Apr. 2, 2021 (CN) ......................... 202110363523.2

(51) Int. Cl.
*A62C 4/02* (2006.01)

(52) U.S. Cl.
CPC ...................................... *A62C 4/02* (2013.01)

(58) Field of Classification Search
CPC ........................................................ A62C 4/02
(Continued)

(56) References Cited

U.S. PATENT DOCUMENTS 2,420,599 A * 5/1947 Jurs .......................... A62C 4/02 55/480
5,402,603 A * 4/1995 Henley .................... A62C 4/02 48/190
5,927,312 A 7/1999 Dryden et al.

FOREIGN PATENT DOCUMENTS

CN 206837278 U 1/2018
CN 108379761 A 8/2018
(Continued)

*Primary Examiner* — Vivek K Shirsat
(74) *Attorney, Agent, or Firm* — NKL Law; Allen Xue

(57) ABSTRACT

A flame arrester includes a flame arrester housing that has a fluid channel defined therein and an inlet and an outlet which are communicated with the fluid channel. The fluid channel is internally provided with a flame arresting unit for preventing flame propagation One side of the flame arresting unit is provided with a deformation unit configured to deform when the internal temperature of the fluid channel reaches a preset temperature to reduce the flow area of the fluid channel towards the outlet. The deformation unit is provided on one side of the flame arresting unit, and when continuous combustion is formed at the flame arresting unit, the deformation unit deforms to reduce the flow area of the fluid channel on the surface of the flame arresting unit to increase a gas flow rate to move the flame is away from the surface of the flame arresting unit.

18 Claims, 9 Drawing Sheets

(58) Field of Classification Search
USPC ................ 137/75, 74, 72; 431/346; 454/369
See application file for complete search history.

(56) References Cited

FOREIGN PATENT DOCUMENTS

| | | | |
|---|---|---|---|
| CN | 110496339 | A | 11/2019 |
| CN | 211751996 | U | 10/2020 |
| CN | 113889963 | A | 1/2022 |
| JP | 1974041654 | Y | 11/1974 |
| JP | 1984063468 | U | 4/1984 |
| JP | H09303305 | A | 11/1997 |
| JP | 2007017091 | A | 1/2007 |
| JP | 2015194229 | A | 11/2015 |

* cited by examiner

FLAME ARRESTER HAVING DEFORMATION UNIT ASSEMBLY

FIELD

The present disclosure relates to the technical field of flame arresting and explosion suppression, in particular to a flame arrester having a deformation unit assembly.

BACKGROUND

Flame arresters are a sort of safety apparatuses, which are mounted on the inlets and outlets of devices or on pipelines, allow the medium to circulate, but can arrest the flames and prevent the spreading of flames and explosion. At present, the flame arresters are mainly corrugated plate flame arresters, which can prevent the spreading of deflagrating and detonating flames. When persistent burning occurs at a flame arresting disc, the heat released by the flames will raise the temperature of flame arresting disc at the non-protected side, and will be transferred to the protected side through heat conduction, while the combustible gas flowing through the flame arresting disc can take away part of the heat and cool down the flames. Specifically, at a high flow rate of the combustible gas, a jet fire (similar to a gas stove) will be formed at the flame arresting disc, and the flames will rise to a certain extent away from the flame arresting disc; if the cooling rate of the combustible gas is higher than the heating rate of the flames, no backfiring will occur. However, if the flow rate of the combustible gas is low, the gas burns at the surface of the flame arresting disc, and the flames heat the flame arresting disc at a rate higher than the cooling rate of the combustible gas, the temperature of the flame arresting disc will rise continuously. When the temperature reaches the self-ignition point of the combustible gas, the gas at the protected side will be ignited, resulting in a failure of the flame arresting disc and backfiring and flash explosion. Apparently, the traditional flame arresters usually can't withstand long-time burning; in addition, when the combustible gas flows out of the pipeline continuously, persistent burning may occur at the surface of the flame arresting disc of the flame arrester, leading to backfiring of the flame arrester.

SUMMARY

An object of the present disclosure is to provide a novel flame arrester having a deformation unit assembly, in order to overcome a problem that flame arresters in the prior art can't withstand long-time burning.

To attain the above object, the present disclosure provides a flame arrester having a deformation unit assembly, which comprises a flame arrester housing that has a fluid channel defined therein and an inlet and an outlet in communication with the fluid channel, wherein the fluid channel is provided with a flame arresting unit therein for preventing flame propagation, one side of the flame arresting unit facing the outlet of the flame arrester housing is provided with a deformation unit that is configured to deform when the internal temperature of the fluid channel reaches a preset temperature, so that a flow area of the fluid channel towards the outlet is reduced.

Preferably, the deformation unit comprises a deformation unit assembly, which comprises deformation unit members that are made of a shape memory alloy and mounted on the surface of the flame arresting unit by means of a bracket, and form gaps for a fluid to pass through; the deformation unit members are configured to deform at the preset temperature, so as to reduce the cross-sectional area of the gaps.

Preferably, the deformation unit assembly is flower-shaped and comprises a plurality of petal-shaped element bodies, which are the deformation unit members; under normal operating conditions, the deformation unit assembly is in a contracted state, in which the plurality of element bodies are positioned closely together; when the internal temperature of the fluid channel reaches the preset temperature, the deformation unit assembly deforms under heat, and the element bodies expand.

Preferably, each of the element bodies is shaped to be curved smoothly upward from bottom.

Preferably, the deformation unit members are a plurality of strips that are arranged in parallel and at an interval with each other, so that the gaps are formed between every two adjacent strips; when the internal temperature of the fluid channel reaches the preset temperature, the strips expand and fit to the side of the flame arresting unit.

Preferably, the strips are arranged towards the outlet.

Preferably, the strips are folded in half in their length direction; when the internal temperature of the fluid channel reaches the preset temperature, a part of the strips connected with the flame arresting unit fit to the side of the flame arresting unit, while the other part of the strips extend in the length direction of the fluid channel.

Preferably, the flame arrester housing is in a cylindrical shape, and comprises a variable diameter section and a flame arresting section that are connected with each other, wherein an inner diameter of the variable diameter section is configured to increase towards the flame arresting section, an end of the variable diameter section away from the flame arresting section forms the inlet, and an end of the flame arresting section away from the variable diameter section forms the outlet.

Preferably, the flame arresting unit and the deformation unit are arranged in the flame arresting section, and the deformation unit is positioned at a side of the flame arresting unit near the outlet.

Preferably, the variable diameter section comprises a straight section and an expander section that are connected with each other, wherein the expander section is arranged between the straight section and the flame arresting section, and an inner diameter of the expander section is configured to gradually increase towards the flame arresting section.

Preferably, a ratio of the maximum diameter of the expander section to the diameter of the inlet is 1.2-3.

Preferably, the flame arrester housing is in a cylindrical shape, and comprises a first variable diameter section, a flame arresting section and a second variable diameter section that are connected sequentially, wherein an end of the first variable diameter section away from the flame arresting section forms the inlet, an end of the second variable diameter section away from the flame arresting section forms the outlet, an inner diameter of the first variable diameter section is configured to increase towards the flame arresting section, and an inner diameter of the second variable diameter section is configured to increase towards the flame arresting section.

Preferably, the flame arresting unit and the deformation unit are arranged in the flame arresting section; there are two deformation units, and the two deformation units are arranged on two sides of the flame arresting unit respectively.

Preferably, the first variable diameter section comprises a first straight section and a first expander section that are connected with each other, wherein the first expander section is arranged between the first straight section and the flame arresting section, and an inner diameter of the first expander section is configured to gradually increase towards the flame arresting section.

Preferably, the second variable diameter section comprises a second straight section and a second expander section that are connected with each other, the second expander section is arranged between the second straight section and the flame arresting section, and the inner diameter of the second expander section is configured to gradually increase towards the flame arresting section.

Preferably, the flame arresting section is in a straight shape, and the first straight section and the second straight section, the first expander section and the second expander section are symmetrically arranged on two sides of the flame arresting section respectively.

Preferably, a ratio of the maximum diameter of the first and second expander sections to the diameter of the inlet is 1.5-3.

Preferably, the flame arresting unit comprises one or more corrugated plate flame arresting discs.

Preferably, the preset temperature is 60° C.-200° C., preferably 80° C.-120° C.

Preferably, the deformation unit is configured to recover to an initial state of the deformation unit when the internal temperature of the fluid channel is lower than the preset temperature.

Preferably, the time required for the deformation unit to recover to the initial state is 1-10 s, preferably 2-5 s.

According to the above technical scheme, the flame arrester having a deformation unit assembly in the present disclosure is provided with a deformation unit at a side of the flame arresting unit; the deformation unit has little influence on the flow performance of the flame arrester under normal conditions; in the case of backfiring and flash explosion, the flame arrester can prevent the flames from spreading to the protected side, i.e., the side near the inlet; if the combustible gas always flows out of the inlet side, it may establish persistent burning at the outlet side; when the fluid temperature at the outlet side reaches a preset temperature, the deformation unit will deform to reduce the flow area of the fluid channel on the surface of the flame arresting unit. At the same flow rate of a combustible gas, the gas flow speed increases to form a jet fire, which has a flame far away from the flame arresting unit; thus, the influence on the flame arresting unit is reduced and the combustible gas at the protected side is prevented from being ignited as a result of the rise of the temperature under heat. In that way, the flame arrester has not backfiring even in a long-time continuous burning state, and meets the requirement for long-time fire withstand. The preheating temperature is the deformation temperature of the deformation unit.

REFERENCE NUMBERS

Figure 1:
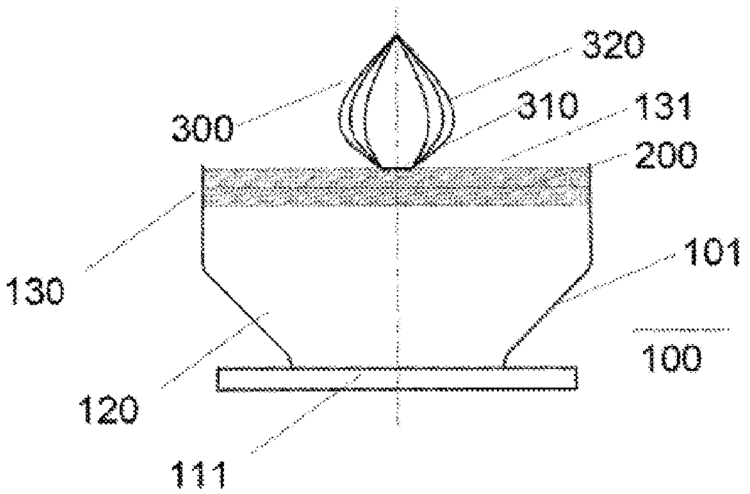
FIG. 1 is a schematic structural diagram of a flame arrester having a deformation unit assembly according to an embodiment 1 of the present disclosure.

100—flame arrestor; 101—flame arrester housing; 111—inlet; 112—first straight section; 113—second straight section; 120—fluid channel; 121—first expander section; 122—second expander section; 130—flame arrestor; 131—outlet; 200—flame arresting unit; 300—deformation unit; 310—bracket; 320—deformation unit member.

DETAILED DESCRIPTION

Hereunder some embodiments of the present disclosure will be detailed with reference to the accompanying drawings. It should be understood that the embodiments described herein are only provided to describe and explain the present disclosure, but are not intended to constitute any limitation to the present disclosure.

In the present disclosure, unless otherwise specified, the terms that denote the orientations are used as follows, for example: “top”, “bottom”, “left” and “right” usually refer to “top”, “bottom”, “left” and “right” as shown in the accompanying drawings; “inside” and “outside” usually refer to inside and outside in relation to the profiles of the components.

The present disclosure provides a flame arrester having a deformation unit assembly. The flame arrester 100 comprises a flame arrester housing 101, which has a fluid channel 120 defined therein, and an inlet 111 and an outlet 131 in communication with the fluid channel 120; the fluid channel 120 is provided therein with a flame arresting unit 200, which comprises one or more corrugated plate flame arresters. Since the flame arresting unit 200 belongs to the prior art, it is not described in detail herein. A side of the flame arresting unit 200 facing the outlet of the flame arrester housing 101 is provided with a deformation unit 300, which is configured to deform when the internal temperature of the fluid channel 120 reaches a preset temperature, so that the flow area of the fluid channel towards the outlet 131 is reduced, i.e., the deformation unit 300 deforms to a state in which the flow area of the fluid channel 120 on the surface of the flame arresting unit 200 is reduced, thereby the flow ratio of the fluid is increased. The preset temperature is 60° C.-200° C., preferably 80° C.-120° C. Further preferably, the deformation unit 300 is configured to recover to the initial state of the deformation unit 300 when the internal temperature of the fluid channel 120 is lower than the preset temperature. Here, the initial state of the deformation unit 300 refers to a state in which the deformation unit 300 hasn't deformed yet. Such a design can ensure that the cooled fluid channel 120 can keep the original effect of medium circulation. The time required for the deformation unit 300 to recover to the initial state is 1-10 s, preferably 2-5 s, so as to meet the application requirements.

The deformation unit 300 comprises a deformation unit assembly, which comprises deformation unit members 320 that are made of a shape memory alloy and mounted on the surface of the flame arresting unit 200 by means of a bracket 310, and form gaps for a fluid to pass through; the deformation unit members 320 are configured to deform at the preset temperature, so as to reduce the cross-sectional area of the gaps. Gaps are formed between the deformation unit members 320 and between the deformation unit members 320 and the flame arrester housing 101, and the deformation unit members 320 are configured Under normal conditions, before the deformation unit members 320 deform, the gaps between the deformation unit members 320 and between the deformation unit members 320 and the flame arrester housing 101 are evenly distributed to ensure the normal flow of the fluid and reduce the influence of the deformation unit members 320 on the fluid flow. When the fluid temperature at the side of the outlet 131 reaches the preset temperature, the deformation unit members 320 deform, thereby drive the gaps to deform, so that the gaps between the deformation unit members 320 and between the deformation unit members 320 and the flame arrester housing 101 are decreased. However, the deformed gaps should still be uniformly distributed, so as to prevent local over-temperature, which may result in backfiring. A shape memory alloy (SMA) is an alloy material that can completely eliminate its deformation at a lower temperature and recover its original shape before deformation after it is heated to a higher temperature. According to the shape memory effect, shape memory alloys can be categorized as one-way memory alloys, two-way memory alloys and full-course memory alloys. Since shape memory alloys belong to the prior art, they are not detailed here. Preferably, the deformation unit 300 employs a Ni—Ti shape memory alloy, in which the Ni content is 45%-55% to meet the application requirements. A third element is added into the Ni—Ti shape memory alloy. The third element includes one or more of zirconium, iron, copper, manganese or niobium, and the content of the third element is 0-20%.

It should be noted most existing flame arresters 100 are made of solid materials that can pass through many small, uniform or non-uniform channels or pores of gas, in order to attain a purpose of extinguishing flames. Those channels or pores should be as small as possible, as long as the flames can pass through them. In that way, the flames will be split into numerous tiny flame streams and thereby distinguished after the flames enter the flame arrester 100. That is to say, the mechanism of extinguishing flames is based on a heat transfer effect and a wall effect. Firstly, the heat transfer effect refers to that the flame exchanges heat with the channel walls, thereby is cooled down owing to the large heater transfer area of the channels or pores, and then is extinguished when it is cooled down to a certain degree. Secondly, as the channel size of the flame arrester 100 is decreased, the probability of collision between the free radicals and the reactant molecules decreases, while the probability of collision between the free radicals and the channel walls increases. When the channel size is decreased to a certain value, the wall effect leads to a condition under which the flames can't survive anymore; thus, the flame is terminated.

Based on the above flame arresting principle of the flame arrester 100, the present disclosure can realize the division of flame arresting performance and flow performance of the flame arrester 100 under different temperature conditions, which is achieved by utilizing the deformation characteristics of the shape memory alloy at different temperatures. Specifically, when the high flow performance of the flame arrester 100 is to be utilized under normal operating conditions, i.e., at room temperature, the material with a shape memory function should be made into a high flow-performance structure; When the flame arresting performance of the flame arrester 100 is to be utilized under abnormal working conditions, i.e., at the deformation temperature, the temperature of the material having a shape memory function rises owing to the fire burning, and the structure of the material changes, thereby the size of the gaps is decreased. Besides, since the deformation unit assembly in the flame arrester 100 in the present disclosure are made of a shape memory alloy, it is more durable than the flame arrester cores in the prior art.

The working process of the flame arrester 100 in the present disclosure is as follows:

At normal temperature, a plurality of deformation unit members 320 are machined into the design shape and fixed to the side of the flame arresting unit 200 facing the outlet 131 by means of the bracket 310. The deformation unit members 320 form gaps, and the fluid in the external pipeline enters from the inlet 111, passes through the flame arresting unit 200 first, and then flows out of the outlet 131 through the deformation unit members 320. At this time, the flow performance is good and the pressure drop is small.

When the deflagrating flame in the external pipeline enters the flame arrester 100 and establishes persistent burning at the side of the outlet 131, the temperature inside the fluid channel 120 will rise accordingly, and the temperature of the deformation unit 320 will rise under the heat. When the temperature enters the deformation temperature zone and reaches the transition temperature, the deformation unit 320 will deform and expand, and the gaps in the fluid channels 120 will be decreased, so that the flow rate of the fluid will be increased, thereby a jet fire is formed and the flame is away from the flame arrester 200.

When the temperature returns to the normal temperature, the deformation unit 320 recovers to the initial state, forming gaps for the fluid to flow through, so that the fluid can flow through the gaps. It is seen from the working process described above, the flame arrester having a deformation unit assembly in the present disclosure is provided with a deformation unit 300 at a side of the flame arresting unit 200; the deformation unit 300 has little influence on the flow performance of the flame arrester 100 under normal conditions; in the case of backfiring and flash explosion, the flame arrester 200 can prevent the flames from spreading to the protected side, i.e., the side near the inlet 111; if the combustible gas always flows out of the side of the inlet 111, it may establish persistent burning at the side of the outlet 131; when the fluid temperature at the side of the outlet 131 reaches a preset temperature, the deformation unit 300 will deform to reduce the flow area of the fluid channel 120 on the surface of the flame arresting unit 200. At the same flow rate of a combustible gas, the gas flow speed increases to form a jet fire, which has a flame far away from the flame arresting unit 200; thus, the influence on the flame arresting unit 200 is reduced and the combustible gas at the protected side is prevented from being ignited as a result of the rise of the temperature under heat. In that way, the flame arrester 100 has not backfiring even in a long-time continuous burning state, and meets the requirement for long-time fire withstand. The preheating temperature is the deformation temperature of the deformation unit 300.

In some embodiments, as shown in FIGS. 1 to 6, the flame arrester housing 101 is in a cylindrical shape, and comprises a variable diameter section and a flame arresting section 130 that are connected with each other. The inner diameter of the variable diameter section is configured to increase towards the flame arresting section 130, an end of the variable diameter section away from the flame arresting section 130 forms the inlet 111, and an end of the flame arresting section away from the variable diameter section forms the outlet 131. The flame arresting unit 200 and the deformation unit 300 are arranged in the flame arresting section 130, and the deformation unit 300 is located at a side of the flame arresting unit 200 near the outlet 131. Furthermore, the variable diameter section comprises a straight section and an expander section that are connected with each other, the expander section is arranged between the straight section and the flame arresting section 130, and the inner diameter of the expander section is configured to gradually increase towards the flame arresting section 130. Furthermore, a ratio of the maximum diameter of the expander section to the diameter of the inlet 111 is 1.2-3. The flame arrester housing 101 of this design has a reasonable structure, which ensures the flow effect of the fluid.

In some other embodiments, as shown in FIGS. 7-18, the flame arrester housing 101 is in a cylindrical shape, and comprises a first variable diameter section, a flame arresting section 130 and a second variable diameter section that are connected sequentially. The end of the first variable diameter section away from the flame arresting section 130 forms the inlet 111, and the end of the second variable diameter section away from the flame arresting section 130 forms the outlet 131. The inner diameter of the first variable diameter section is configured to increase toward the flame arresting section 130, and the inner diameter of the second variable diameter section is configured to increase towards the flame regarding section 130. The flame arresting unit 200 and the deformation unit 300 are arranged in the flame arresting section 130. There are two deformation units 300, which are arranged on the two sides of the flame arresting unit 200 respectively, so as to enable two-way long-time burning. Furthermore, the first variable diameter section comprises a first straight section 112 and a first expander section 121 that are connected with each other, wherein the first expander section 121 is arranged between the straight section 112 and the flame arresting section 130, and the inner diameter of the first expander section is configured to gradually increase towards the flame arresting section 130. Furthermore, the second variable diameter section comprises a second straight section 113 and a second expander section 122 that are connected with each other. The second expander section 122 is arranged between the second straight section 113 and the flame arresting section 130, and the inner diameter of the second expander section 122 is configured to gradually increase toward the flame arresting section 130. Furthermore, the flame arresting section 130 is in a straight shape, and the first straight section 112, the second straight section 113, the first expander section 121 and the second expander section 122 are symmetrically arranged on the two sides of the flame arresting section 130 respectively. Furthermore, a ratio of the maximum diameter of the first and second expander sections 121 and 122 to the diameter of the inlet 111 is 1.5-3.

Thus, it can be seen that the specific arrangement of the flame arrester housing 101 is not limited, as long as the application requirements are met while a fluid flow effect is ensured.

Embodiment 1

Figure 2:
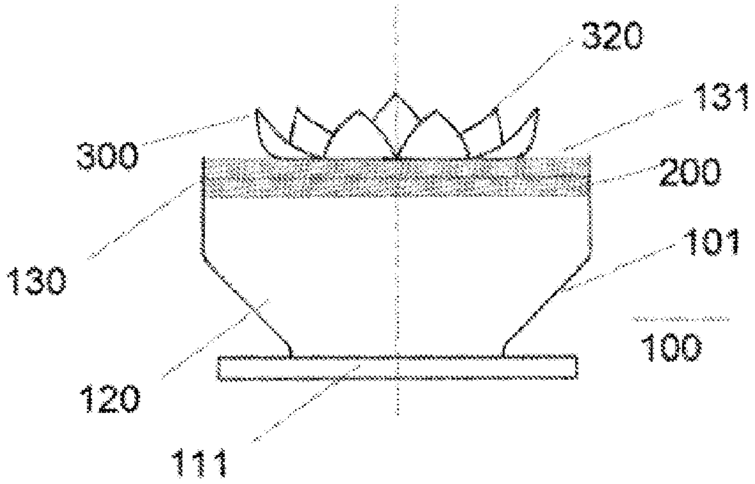
FIG. 2 is a schematic structural diagram of the deformation unit in FIG. 1 at the deformation temperature.

As shown in FIG. 1 and FIG. 2, the deformation unit assembly is flower-shaped and comprises a plurality of petal-shaped element bodies, which are deformation unit members 320. As shown in FIG. 1, under normal working conditions, the deformation unit assembly is in a contracted state, in which the plurality of the elements are close together to reduce the influence on the fluid flow. As shown in FIG. 2, when the internal temperature of the fluid channel 120 reaches the preset temperature, the deformation unit assembly deform under the heat and the element bodies expand, so that the deformation unit assembly expands into a lotus shape, thereby the cross-sectional area of the deformation unit assembly is increased, the size of the gaps is decreased, and the fluid flow rate is increased. A ratio of the maximum diameter of the expander section to the diameter of the inlet 111 is 1.2-2, so as to meet the application requirements. Further preferably, the element body is shaped to curve upward smoothly from the bottom. In such a design, the element body can conduct the flow field of the flame, so that the flame is away from the flame arresting unit 200 at a low combustible gas flow rate; in addition, a plurality of element bodies are evenly distributed in the radial direction, so as to prevent local over-temperature, which may result in backfiring. As shown in FIGS. 1 and 2, the flame arrester housing 101 is in a cylindrical shape, and comprises a variable diameter section and a flame arresting section 130 that are connected with each other. The inner diameter of the variable diameter section is configured to increase towards the flame arresting section 130, an end of the variable diameter section away from the flame arresting section 130 forms the inlet 111, and an end of the flame arresting section away from the variable diameter section forms the outlet 131.

Embodiment 2

Figure 3:
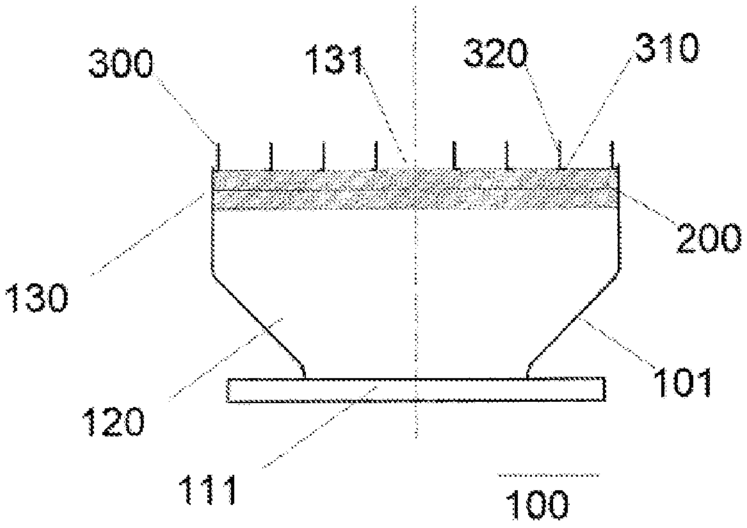
FIG. 3 is a schematic structural diagram of a flame arrester having a deformation unit assembly according to an embodiment 2 of the present disclosure.
Figure 4:
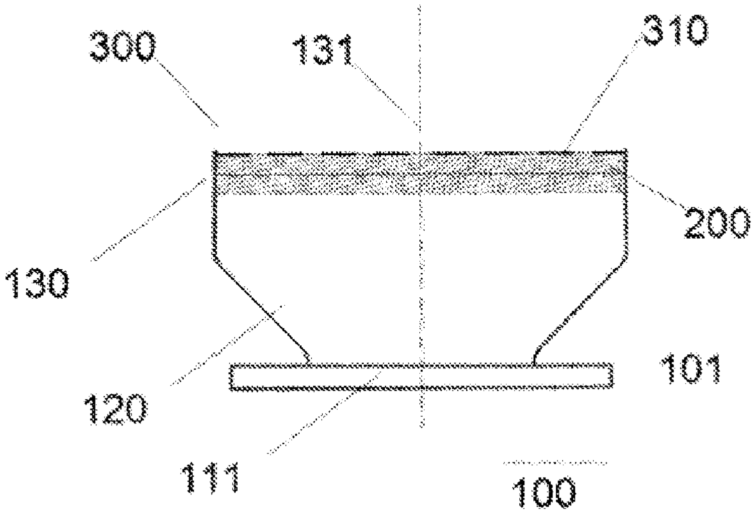
FIG. 4 is a schematic structural diagram of the deformation unit in FIG. 3 at the deformation temperature.

As shown in FIGS. 3 and 4, the deformation unit members 320 are strips, and a plurality of strips are arranged in parallel, and the stripes are mounted on the flame arresting unit 200 by means of a bracket 310 respectively, and are arranged at an interval, and the distance between every two adjacent strips is the same, so that a uniform gap is formed between two adjacent strips. Under normal conditions, the strips are arranged towards the outlet 131, so that the strips play a guiding role for the fluid flow. When the internal temperature of the fluid channel 120 reaches the preset temperature, the strips expand and fit to a side of the flame arresting unit, thereby the side of each strips comes into contact with the flame arresting unit 200; thus, the flow area of the fluid flowing through the flame arresting unit 200 is reduced, and the flow rate is increased. Furthermore, a ratio of the maximum diameter of the expander section to the diameter of the inlet 111 is 1.2-2, so that the flame arrester housing 101 can meet the application requirements. It is worthy to note: after the strips expand and fit to the side of the flame arresting unit 200, a gap should exist between two adjacent strips, to avoid fully blocking the fluid channel 120. As shown in FIGS. 3 and 4, the flame arrester housing 101 is in a cylindrical shape, and comprises a variable diameter section and a flame arresting section 130 that are connected with each other. The inner diameter of the variable diameter section is configured to increase towards the flame arresting section 130, an end of the variable diameter section away from the flame arresting section 130 forms the inlet 111, and an end of the flame arresting section away from the variable diameter section forms the outlet 131.

Embodiment 3

Figure 5:
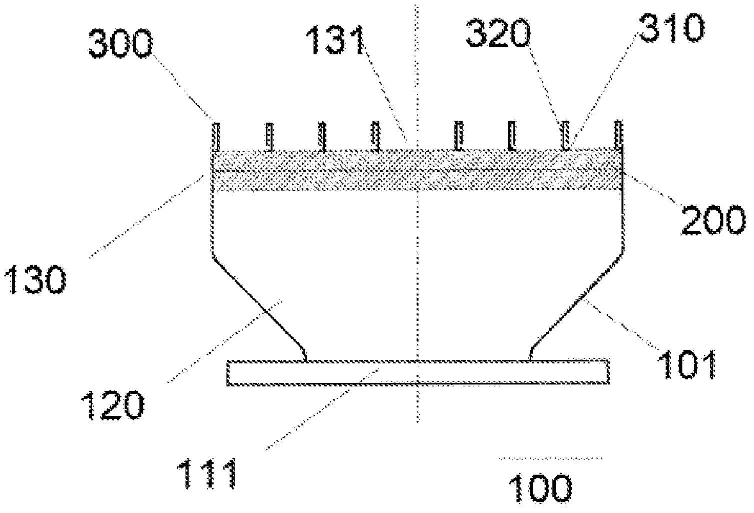
FIG. 5 is a schematic structural diagram of a flame arrester having a deformation unit assembly according to an embodiment 3 of the present disclosure.
Figure 6:
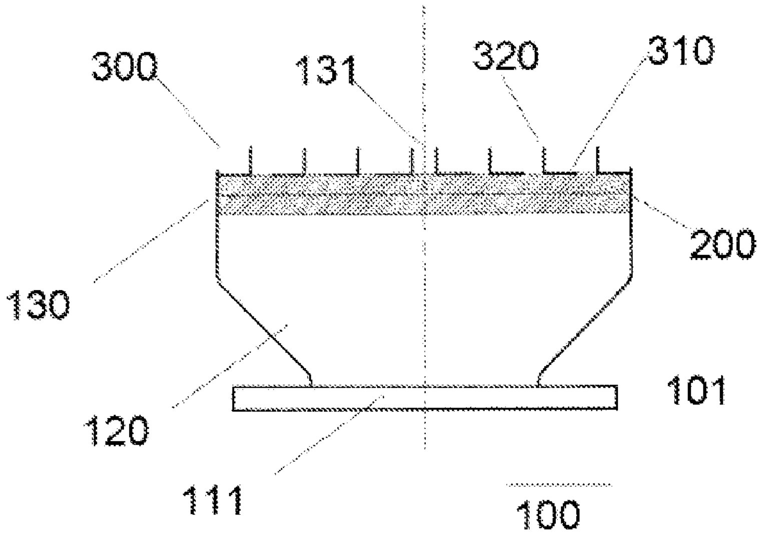
FIG. 6 is a schematic structural diagram of the deformation unit in FIG. 5 at the deformation temperature.

As shown in FIGS. 5 and 6, different from the embodiment 2, in this embodiment, the strips are folded in half in their length direction. Furthermore, under normal conditions, the strips are arranged toward the outlet 131, so that the strips play a guiding role for the flow of the fluid. When the internal temperature of the fluid channel 120 reaches the preset temperature, a part of the strips connected with the flame arresting unit 200 fit to the side of the flame arresting unit 200, while the other part of the strips extend in the length direction of the fluid channel 120 to guide the flame flow field. In some other embodiments, the strips are folded in half in their length direction to form two parallel stripe bodies, which is to say, the two parallel strip bodies are broken at the connection, and the two parallel strip bodies are connected with the flame arresting unit 200 via the bracket 310. The deformation temperatures of the two stripe bodies may be different, and the deformation temperature of one of the strip bodies is higher than the preset temperature. When persistent burning is established at the outlet 131 and the temperature reaches the preset temperature, the strip body that has a lower deformation temperature deforms and fits to the side of the flame arresting unit 200, and the other strip body can guide the flame flow field, so that the flame is away from the flame arresting unit 200 at a low combustible gas flow rate. The deformation temperatures of the two strip bodies may be the same. When persistent burning is formed at the side of the outlet 131 and the temperature reaches the preset temperature, both of the two strip bodies deform and fit to the side of the flame arresting unit 200. Similarly, a gap should exist between two adjacent strip bodies after the deformation. As shown in FIGS. 5 and 6, the flame arrester housing 101 is in a cylindrical shape, and comprises a variable diameter section and a flame arresting section 130 that are connected with each other. The inner diameter of the variable diameter section is configured to increase towards the flame arresting section 130, an end of the variable diameter section away from the flame arresting section 130 forms the inlet 111, and an end of the flame arresting section away from the variable diameter section forms the outlet 131.

Embodiment 4

Figure 7:
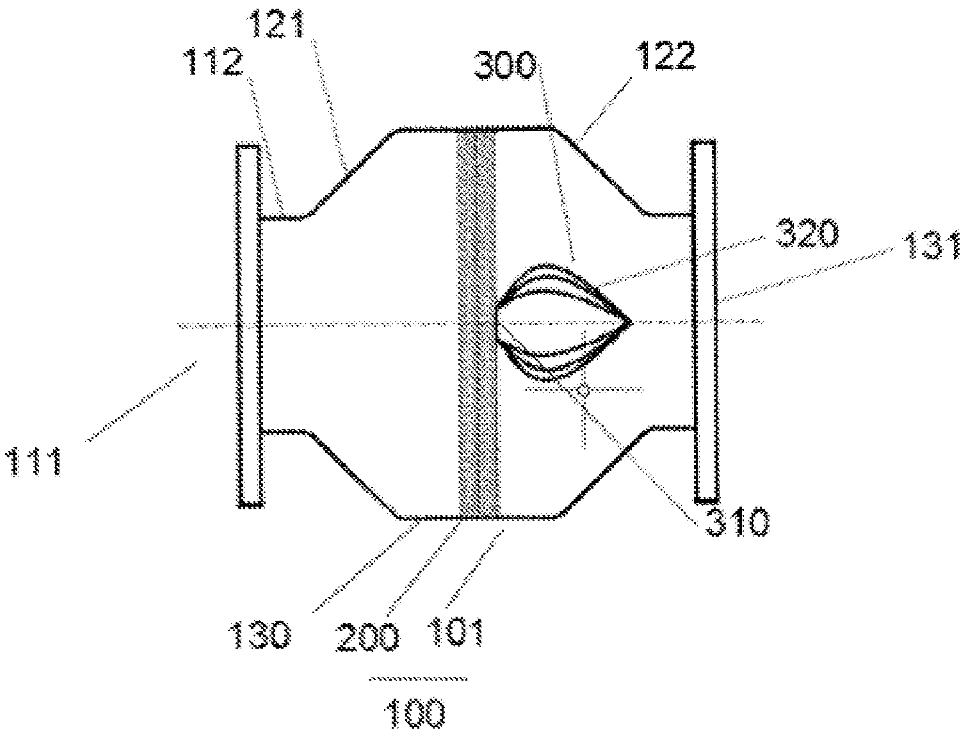
FIG. 7 is a schematic structural diagram of a flame arrester having a deformation unit assembly according to an embodiment 4 of the present disclosure.
Figure 8:
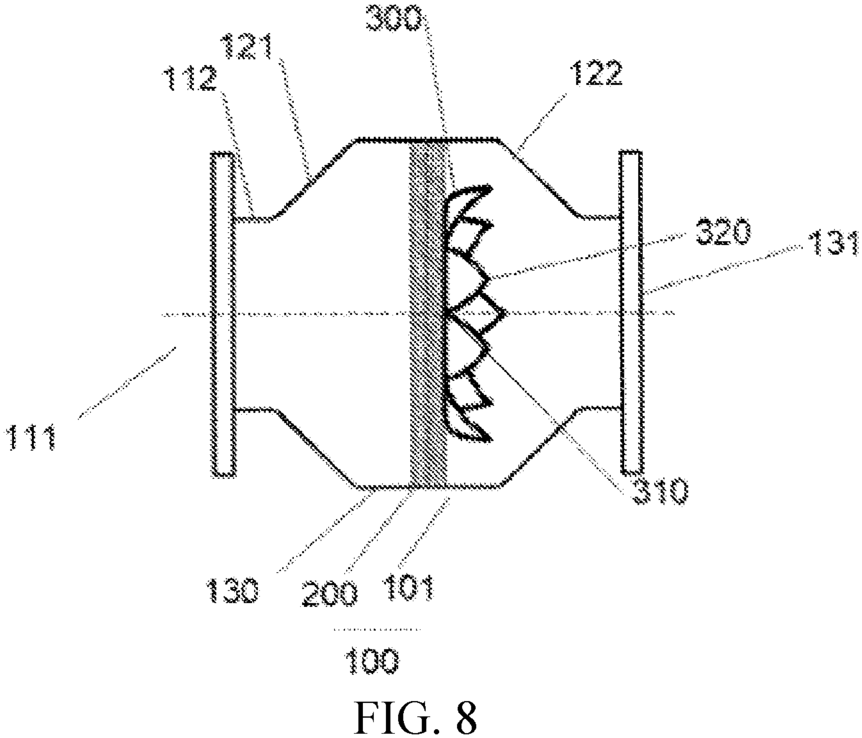
FIG. 8 is a schematic structural diagram of the deformation unit in FIG. 7 at the deformation temperature.

As shown in FIGS. 7 and 8, the configuration of the deformation unit 300 in this embodiment is the same as that of the deformation unit 300 in the embodiment 1, so it is not detailed here. Different from the embodiment I, the flame arrester housing 101 in this embodiment is in a cylindrical shape, and the flame arrester housing 101 comprises a first variable diameter section, a flame arresting section 130 and a second variable diameter section that are connected sequentially; an end of the first variable diameter section away from the flame arresting section 130 forms the inlet 111, and an end of the second variable diameter section away from the flame arresting section 130 forms the outlet 131. The inner diameter of the first variable diameter section is configured to increase toward the flame arresting section 130, and the inner diameter of the second variable diameter section is configured to increase towards the flame arresting section 130. It can be seen that the deformation unit 300 in this arrangement is applicable to various flame arresters 100.

Embodiment 5

Figure 9:
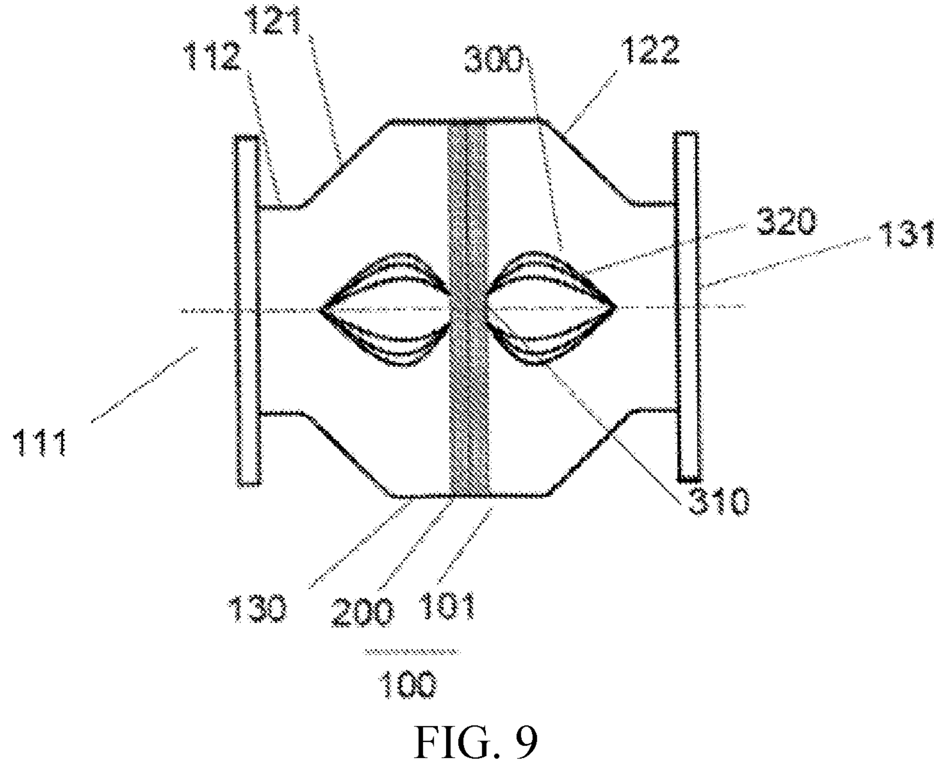
FIG. 9 is a schematic structural diagram of a flame arrester having a deformation unit assembly according to an embodiment 5 of the present disclosure.
Figure 10:
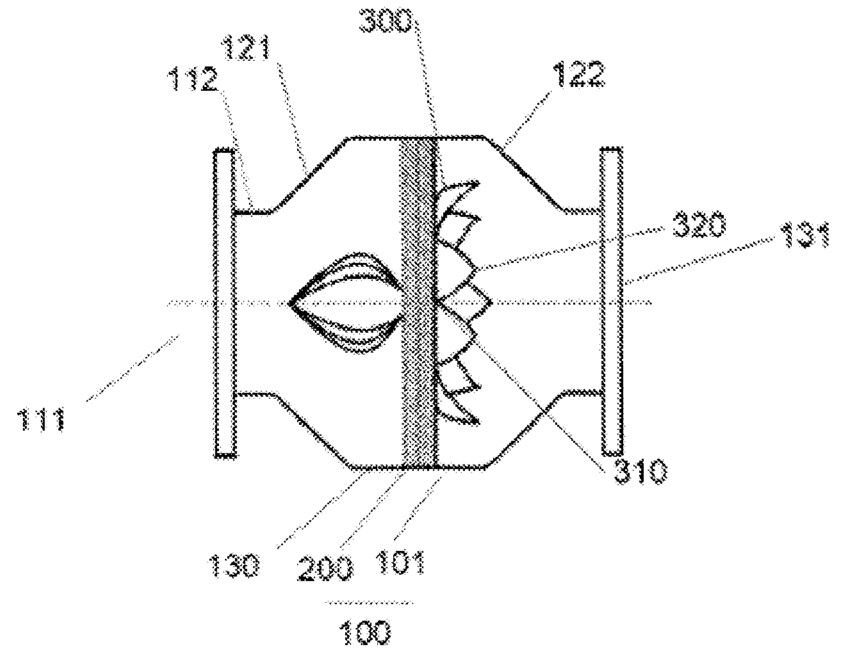
FIG. 10 is a schematic structural diagram of the deformation unit in FIG. 9 at the deformation temperature.

A shown in FIGS. 9 and 10, the deformation unit 300 and the flame arrester housing 101 in this embodiment are arranged in the same way as those in the embodiment 4, therefore they are not detailed here. Different from the embodiment 4, the two sides of the flame arresting unit 200 in this embodiment are provided with deformation units 300, which enable two-way long-time burning.

Embodiment 6

Figure 11:
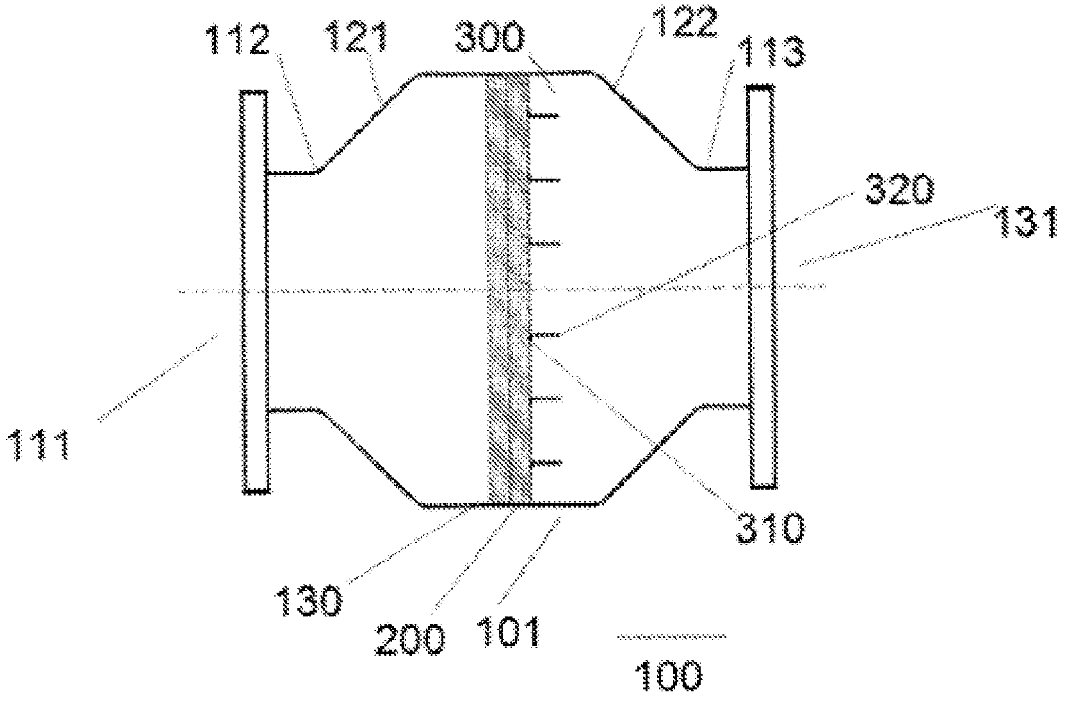
FIG. 11 is a schematic structural diagram of a flame arrester having a deformation unit assembly according to an embodiment 6 of the present disclosure.
Figure 12:
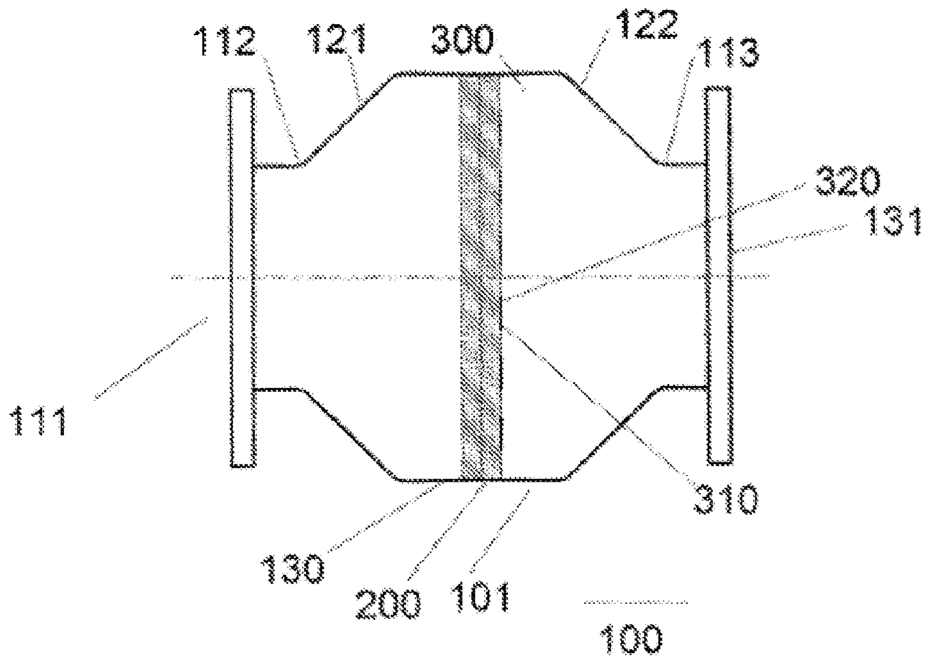
FIG. 12 is a schematic structural diagram of the deformation unit in FIG. 11 at the deformation temperature.

As shown in FIGS. 11 and 12, the configuration of the deformation unit 300 in this embodiment is the same as that of the deformation unit 300 in the embodiment 2, so it is not detailed here. Different from the embodiment 2, the flame arrester housing 101 in this embodiment is in a cylindrical shape, and the flame arrester housing 101 comprises a first variable diameter section, a flame arresting section 130 and a second variable diameter section that are connected sequentially; an end of the first variable diameter section away from the flame arresting section 130 forms the inlet 111, and an end of the second variable diameter section away from the flame arresting section 130 forms the outlet 131. The inner diameter of the first variable diameter section is configured to increase toward the flame arresting section 130, and the inner diameter of the second variable diameter section is configured to increase towards the flame arresting section 130. It can be seen that the deformation unit 300 in this arrangement is applicable to various flame arresters 100.

Embodiment 7

Figure 13:
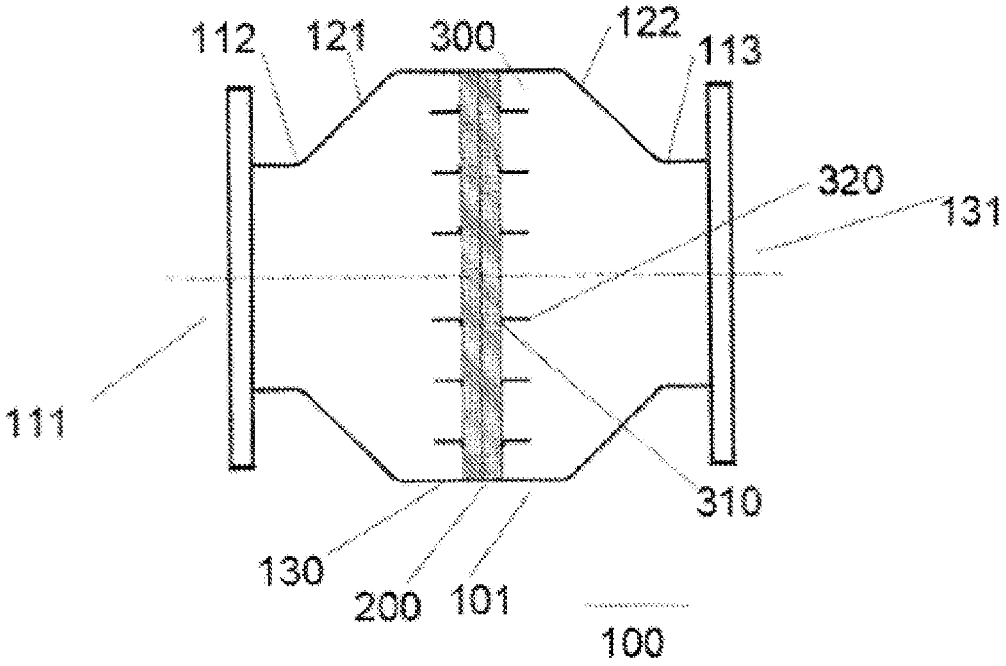
FIG. 13 is a schematic structural diagram of a flame arrester having a deformation unit assembly according to an embodiment 7 of the present disclosure.
Figure 14:
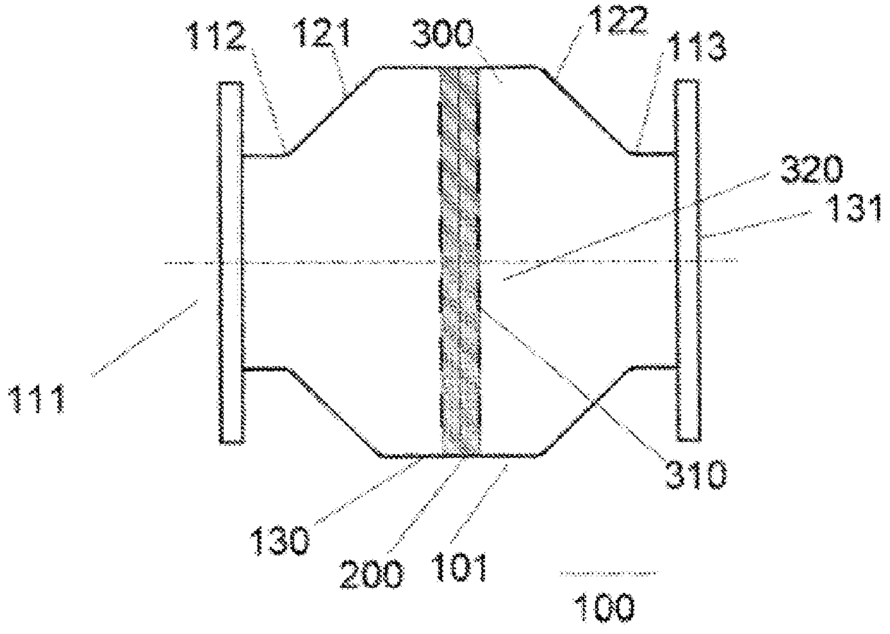
FIG. 14 is a schematic structural diagram of the deformation unit in FIG. 13 at the deformation temperature.

A shown in FIGS. 13 and 14, the deformation unit 300 and the flame arrester housing 101 in this embodiment are arranged in the same way as those in the embodiment 6, therefore they are not detailed here. Different from the embodiment 6, the two sides of the flame arresting unit 200 in this embodiment are provided with deformation units 300, which enable two-way long-time burning.

Embodiment 8

Figure 15:
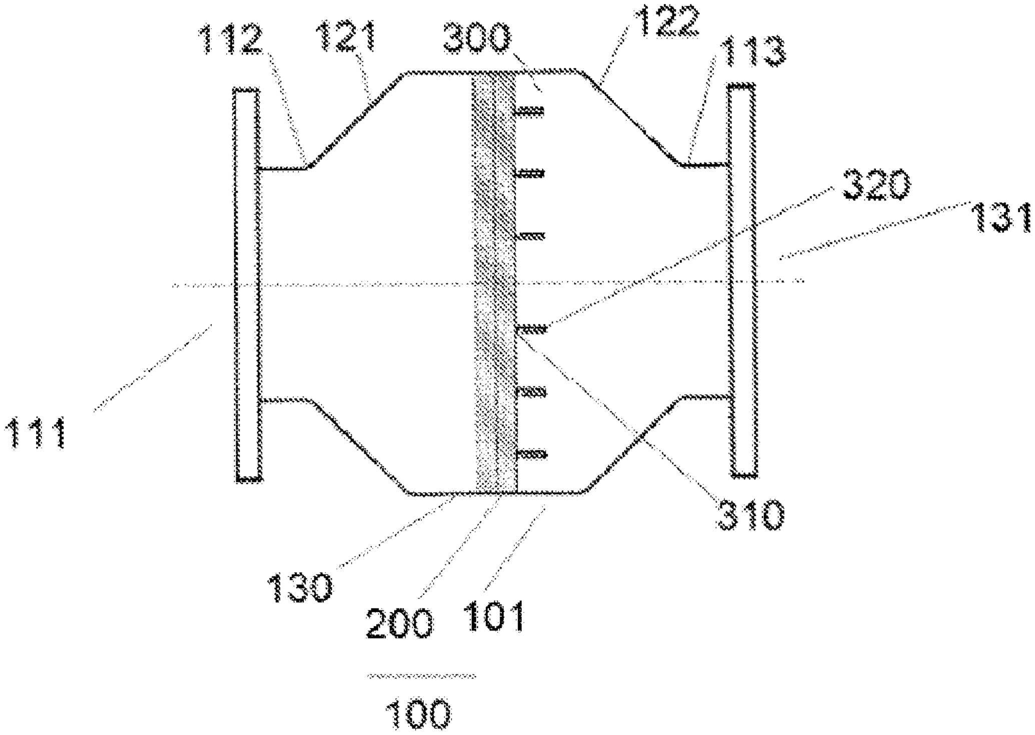
FIG. 15 is a schematic structural diagram of a flame arrester having a deformation unit assembly according to an embodiment 8 of the present disclosure.
Figure 16:
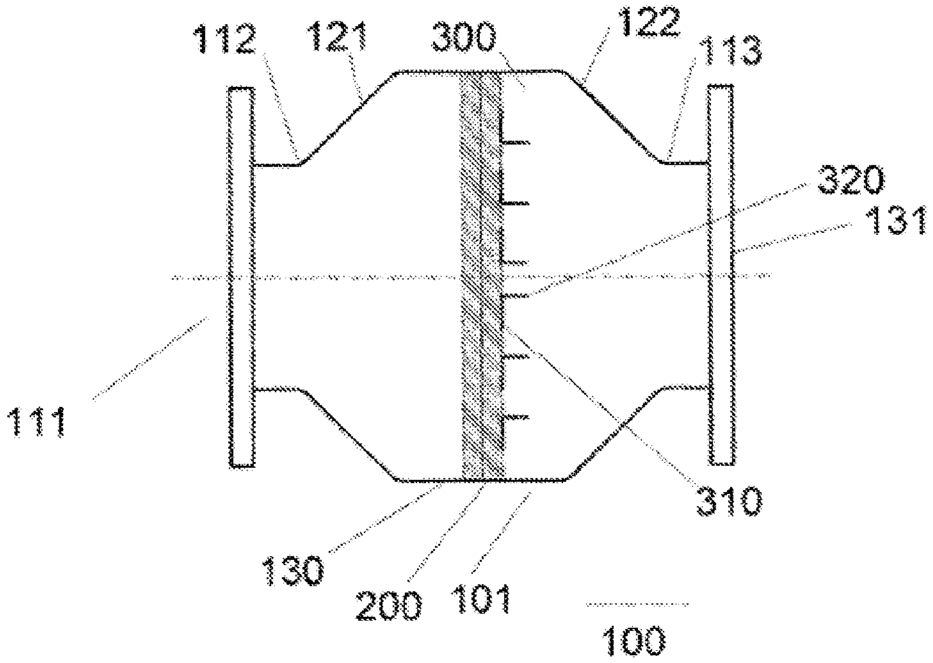
FIG. 16 is a schematic structural diagram of the deformation unit in FIG. 15 at the deformation temperature.
Figure 17:
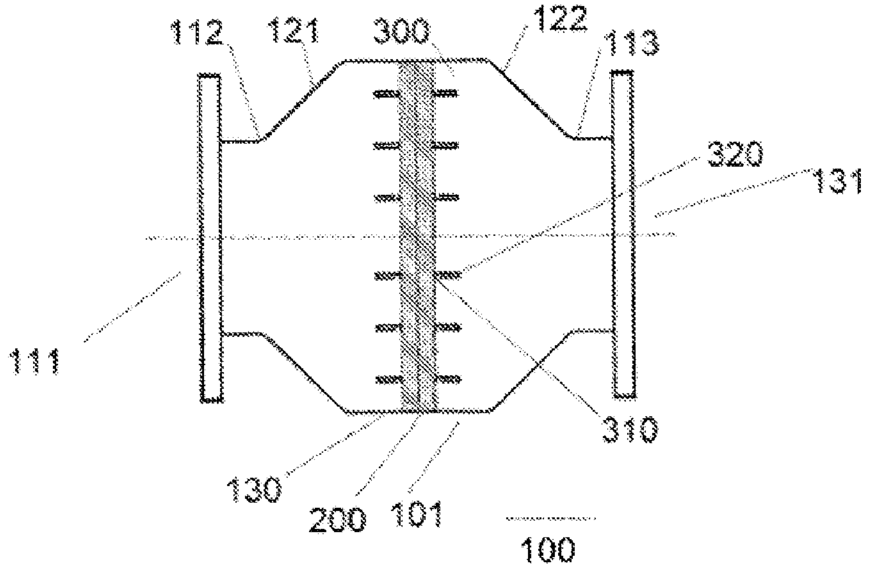
FIG. 17 is a schematic structural diagram of a flame arrester having a deformation unit assembly according to an embodiment 9 of the present disclosure.
Figure 18:
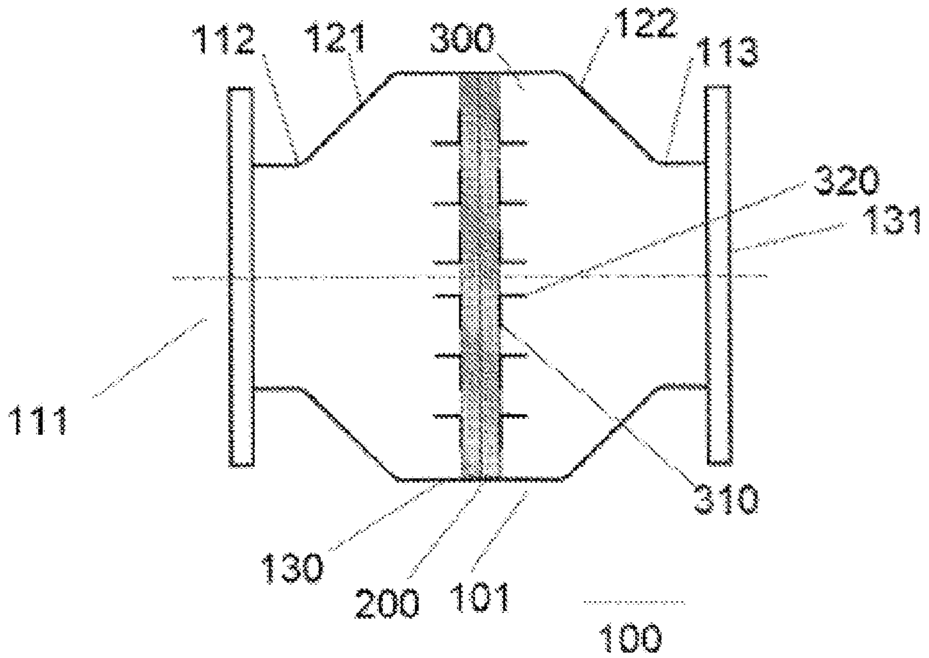
FIG. 18 is a schematic structural diagram of the deformation unit in FIG. 17 at the deformation temperature.

As shown in FIGS. 15 and 16, the configuration of the deformation unit 300 in this embodiment is the same as that of the deformation unit 300 in the embodiment 3, so it is not detailed here. Different from the embodiment 3, the flame arrester housing 101 in this embodiment is in a cylindrical shape, and the flame arrester housing 101 comprises a first variable diameter section, a flame arresting section 130 and a second variable diameter section that are connected sequentially; an end of the first variable diameter section away from the flame arresting section 130 forms the inlet 111, and an end of the second variable diameter section away from the flame arresting section 130 forms the outlet 131. The inner diameter of the first variable diameter section is configured to increase toward the flame arresting section 130, and the inner diameter of the second variable diameter section is configured to increase towards the flame arresting section 130. It can be seen that the deformation unit 300 in this arrangement is applicable to various flame arresters 100.

Embodiment 9

The deformation unit 300 and the flame arrester housing 101 in this embodiment are arranged in the same way as those in the embodiment 8, therefore they are not detailed here. Different from the embodiment 8, the two sides of the flame arresting unit 200 in this embodiment are provided with deformation units 300, which enable two-way long-time burning.

In summary, according to the present disclosure, a deformation unit 300 made of a shape memory alloy is arranged on the side of the flame arresting unit 200 of the flame arrester 100; thus, in the case of backfiring and flash explosion, the gas flow rate can be increased so that the flame is kept away from the flame arresting unit 200. In that way, the flame arrester 100 has no backfiring in a long-time persistent burning state, and meeting the requirements of durability.

While some preferred embodiments of the present disclosure are described above in detail with reference to the accompanying drawings, the present disclosure is not limited to those embodiments. Various simple variations may be made to the technical scheme of the present disclosure within the technical concept of the present disclosure. To avoid unnecessary repetition, various possible combinations are not described specifically in the present disclosure. However, such simple variations and combinations thereof shall also be deemed as having been disclosed and falling in the scope of protection of the present disclosure.

The invention claimed is:

1. A flame arrester, comprising a flame arrester housing (101) that has a fluid channel (120) defined therein and an inlet (111) and an outlet (131) in communication with the fluid channel (120) to form a flow passage, wherein the fluid channel (120) is provided with a flame arresting unit (200) therein for preventing flame propagation, a first side of the flame arresting unit (200) facing the outlet (131) of the flame arrester housing (101) is provided with a deformation unit (300), and wherein the deformation unit (300) comprises a plurality of deformation unit members (320) that are made of a shape memory alloy and mounted on and protrude from the first side of the flame arresting unit (200), and the plurality of deformation unit members (320) are configured to deform when an internal temperature of the fluid channel (120) is a preset temperature so as to block a portion of the first side of the flame arresting unit (200).

2. The flame arrester of claim 1, wherein each of the plurality of deformation unit members (320) is a petal-shaped element body, and wherein the plurality of the deformation unit members (320) are in a contracted state when the internal temperature of the fluid channel (120) is below the preset temperature and are expanded when the internal temperature of the fluid channel (120) is at the preset temperature.

3. The flame arrester of claim 2, wherein the petal-shaped element body is curved upward away from the flame arresting unit (200).

4. The flame arrester of claim 1, wherein the plurality of deformation unit members (320) are a plurality of strips that are arranged in parallel and a gap is formed between every two adjacent strips.

5. The flame arrester of claim 4, wherein the plurality of strips are arranged towards the outlet (131).

6. The flame arrester of claim 4, wherein each strip has a first portion and a second portion folded together, and a joint between the first portion and the second portion is attached to the first side of the flame arresting unit (200), when the internal temperature of the fluid channel (120) is at the preset temperature, the second portion is separated from the first portion and becomes attached to the first side of the flame arresting unit (200) so as to block a portion thereof.

7. The flame arrester of claim 1, wherein the flame arrester housing (101) is in a cylindrical shape, and comprises a variable diameter section and a flame arresting section (130) that are connected with each other, wherein an inner diameter of the variable diameter section is configured to increase towards the flame arresting section (130), an end of the variable diameter section away from the flame arresting section (130) forms the inlet (111), and an end of the flame arresting section (130) away from the variable diameter section forms the outlet (131).

8. The flame arrester of claim 7, wherein the variable diameter section comprises a straight section and an expander section that are connected with each other, wherein the expander section is arranged between the straight section and the flame arresting section (130), and an inner diameter of the expander section is configured to gradually increase towards the flame arresting section (130).

9. The flame arrester of claim 8, wherein a ratio of the maximum diameter of the expander section to the diameter of the inlet (111) is 1.2-3.

10. The flame arrester of claim 1, wherein the flame arrester housing (101) is in a cylindrical shape, and comprises a first variable diameter section, a flame arresting section (130) and a second variable diameter section that are connected sequentially, wherein an end of the first variable diameter section away from the flame arresting section (130) forms the inlet (111), an end of the second variable diameter section away from the flame arresting section (130) forms the outlet (131), an inner diameter of the first variable diameter section is configured to increase towards the flame arresting section (130), and an inner diameter of the second variable diameter section is configured to increase towards the flame arresting section (130).

11. The flame arrester of claim 10, wherein the flame arresting unit (200) and the deformation unit (300) are arranged in the flame arresting section (130); and further comprises a second deformation unit attached to a second side of the flame arresting unit (200) that faces away from the outlet (131) of the flame arrester housing (101).

12. The flame arrester of claim 10, wherein the first variable diameter section comprises a first straight section (112) and a first expander section (121) that are connected with each other, wherein the first expander section (121) is arranged between the first straight section (112) and the flame arresting section (130), and an inner diameter of the first expander section (121) is configured to increase gradually towards the flame arresting section (130).

13. The flame arrester of claim 12, wherein the second variable diameter section comprises a second straight section (113) and a second expander section (122) that are connected with each other, wherein the second expander section (122) is arranged between the second straight section (113) and the flame arresting section (130), and an inner diameter of the second expander section (122) is configured to increase gradually towards the flame arresting section (130).

14. The flame arrester of claim 13, wherein the flame arresting section (130) is straight, and the first straight section (112) and the second straight section (113), the first expander section (121) and the second expander section (122) are symmetrically arranged on two sides of the flame arresting section (130) respectively.

15. The flame arrester of claim 12, wherein a ratio of the maximum diameter of the first and second expander sections (121, 122) to the diameter of the inlet (111) is 1.5-3.

16. The flame arrester of claim 1, wherein the flame arresting unit (200) comprises one or more corrugated plate.

17. The flame arrester of claim 1, wherein the preset temperature is 60° C.-200° C.

18. The flame arrester of claim 1, wherein each deformation unit (300) is configured to restore to an initial state when the internal temperature of the fluid channel (120) is lower than the preset temperature.

* * * * *